Jan. 30, 1968 KINTARŌ KURITA 3,366,243
FILTER PLATE COUPLING APPARATUS IN A FILTER PRESS
Filed Dec. 30, 1965 3 Sheets-Sheet 1

Kintarō Kurita
INVENTOR.

BY Wenderoth, Lind
and Ponack,
Attorneys

3,366,243
FILTER PLATE COUPLING APPARATUS IN A FILTER PRESS
Kintaro Kurita, 22 2-chome, Kitasakaigawa-cho, Nishi-ku, Osaka, Japan
Filed Dec. 30, 1965, Ser. No. 517,774
3 Claims. (Cl. 210—225)

ABSTRACT OF THE DISCLOSURE

An apparatus for coupling filter plates in a filter press and for supporting a filter cloth between the plates having a pair of pivoted links on each side of a plate, which links extend between adjacent plates with a rod suspended from the links for supporting the filter cloth. Pivotally mounted on each plate is an integral hook and arm, the hook securing adjacent plates and the arm cooperating with the links so that the plates are released one at a time upon opening of the filter press.

---

This invention relates to a filter plate coupling apparatus for a filter press.

In a filter press of a known type, each two adjacent filter plates are stuck quite tightly to each other by the viscosity of filter cake accumulated therein with most liquids, and when the filter plates are separated to be cleared of filter cake, it often happens that two or more of them, which are supposed to be separated one by one, remain stuck to each other.

The object of the present invention is to provide means for remedying this defect.

With this object in view the present invention provides a filter plate coupling coupling apparatus wherein a hook and a catch for it are furnished on each shoulder of each filter plate that the hook can be engaged with the corresponding catch on the next filter plate, with a disengaging device provided for each hook.

According to the present invention, when a filter plate has reached the end of its travel, the hook on the next filter plate is disengaged from the catch on the third filter plate, and in this way all the filter plates can be separated in succession, separately without fail, facilitating the clearance of the filter cake accumulated therein.

Other and the further objects of the present invention will become apparent from the following specification and claims taken together with the accompanying drawings in which is shown the preferred embodiment of the filter plate coupling apparatus in a filter press according to the present invention.

Figure 1:
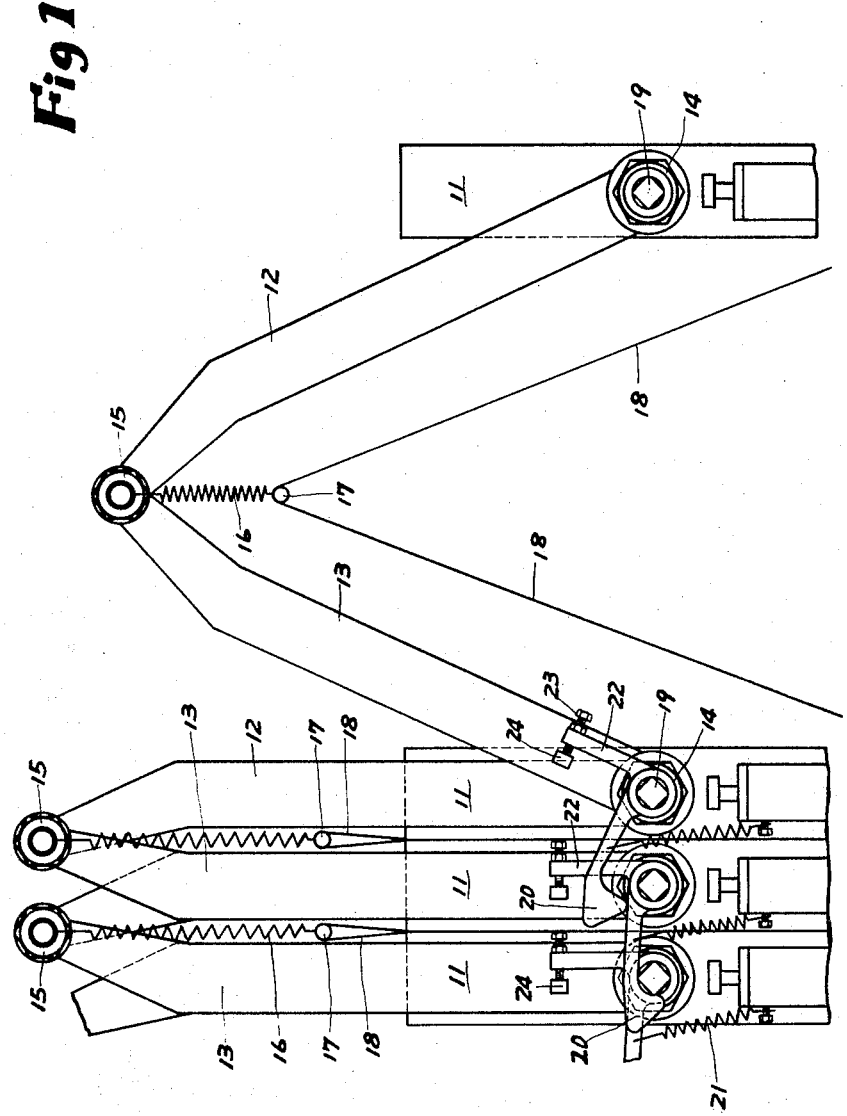
FIG. 1 is a side view of a part of a filter press embodying the present invention.
Figure 2:
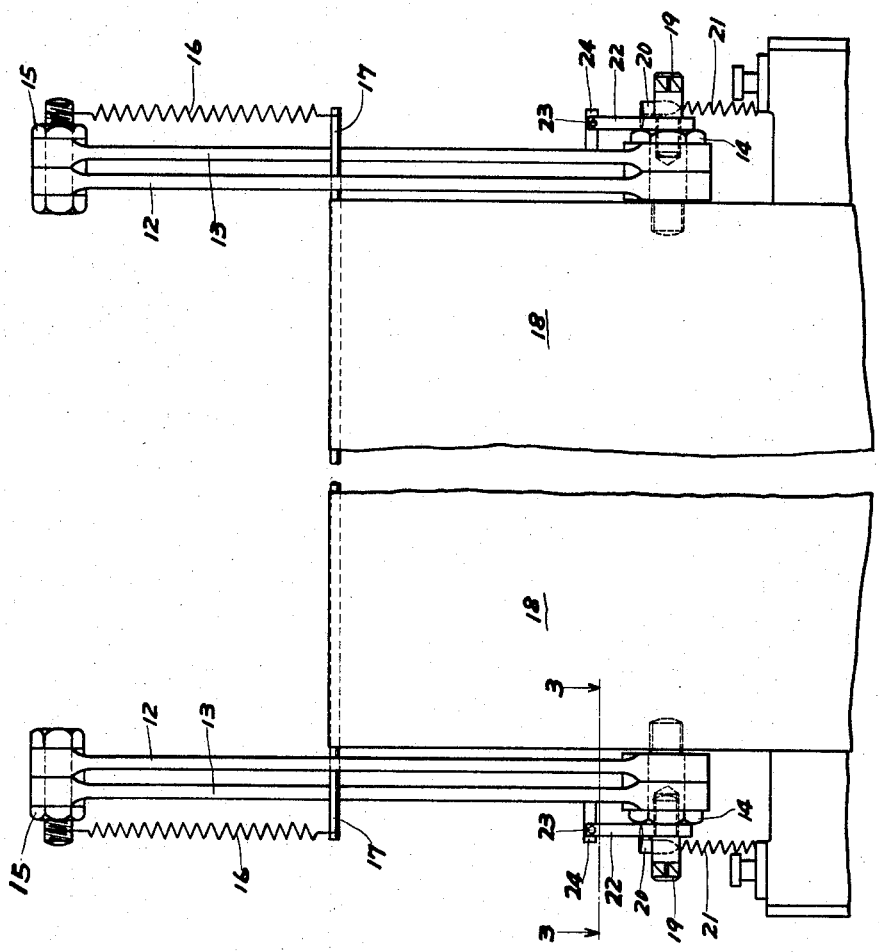
FIG. 2 is an elevation of FIG. 2.
Figure 3:
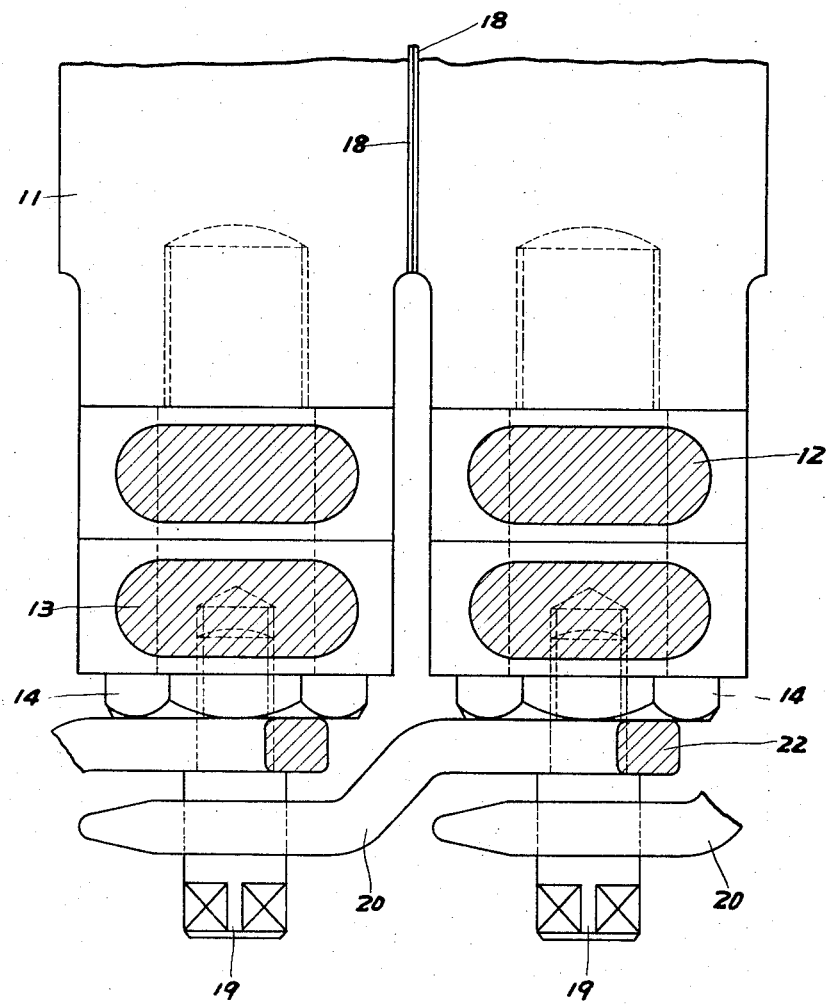
FIG. 3 is a partial sectional view taken on line 3—3 of FIG. 2.

In these drawings reference numeral 11 indicates the filter plates, on the shoulder at each end of which links 12 and 13 of a pair of links are rotatably attached with a fastening 14 such as a bolt. The link 12 on each end of each filter plate is connected with the corresponding link 13 on the next filter plate 11 with a coupling 15 such as a bolt at the upper end thereof, forming a pantographic mechanism. Each coupling 15 is provided with a spring 16, and a horizontal rod 17 hangs therefrom. A filter cloth 18 is hung over the horizontal rod 17 with each lower end thereof fastened to the filter plate 11 on either side thereof.

Into the fastening 14 is screwed a projection 19 such as a bolt, on which a hook 20 is fitted with the hooked end thereof engaged with the projection 19 on the next filter plate 11. A spring 21 is connected between hook 20 and the filter plate 11 on which it is pivoted tending to hold the hook 20 engaged with the next adjacent projection 19. On the hook 20 is formed a rectangular supporting piece 22, at the end of which a bolt 23 is threaded therethrough with the protruding end thereof engaging with a projection 24 formed on the link 13.

According to the present invention, the links 12 and 13 being rotatably attached to the shoulders of the filter plates 11 with the ends thereof rotatably coupled with each other, thus forming a pantograph, and the hook 20 fitted on a projection 19 of the link 13 being engaged with the projection 19 on the next filter plate 11, the link 12 on one filter plate 11 and the link 13 on the next filter plate 11 are turned down as the first filter plate 11 moves away from the second filter plate, so that the hook 20 on the link 13 of the second filter plate 11 is disengaged from the projection 19 on the third filter plate 11. When the first filter plate 11 gets to the end of its travel, the hook 20 of the next filter plate 11 is wholly clear of the projection 19 of the third filter plate 11. Thus it is only when the first filter plate 11 finishes its travel that the next filter plate is ready to be moved on its way.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

What I claim is:

1. A filter plate coupling apparatus for a filter press, comprising two pairs of links for each pair of adjacent filter plates, one pair of links being at each end of the filter plates, the links of each pair being pivotally connected at one end thereof and having the other ends pivotally attached to the respective adjacent filter plates, a projection on each end of each filter plate, a hook member pivotally mounted on each end of each filter plate and engageable with the projection on the next adjacent filter plate away from the direction in which the filter plates are opened for removal of the filter cake, spring means coupled between said hook members and the filter plate on which they are mounted biasing the hook members in a direction to engage the projection on the next adjacent plate, and abutment means on the link members pivoted to each plate and pivoted to the link members on the next adjacent plate in the direction in which the filter plates are opened, said abutment means engaging portions of the hook members for pivoting the hook members to disengage them from the projections when the next adjacent plate in the plate opening direction is moved in the opening direction and the said link members with the abutment means thereon pivot.

2. A filter plate coupling apparatus as claimed in claim 1 in which said hook members are pivoted on said projections, and said projections are coaxial with the pivotal mounting of the link members on the ends of the filter plates.

3. A filter plate coupling apparatus as claimed in claim 2 in which said hook members are L-shaped members with a hook on the end of one arm, said abutment means on said link members engaging the end of the other arm of the hook members for pivoting the hook members.

(References on following page)

References Cited

UNITED STATES PATENTS

| | | | |
|---|---|---|---|
| 3,333,702 | 8/1967 | Muller | 210—230 |
| 1,308,943 | 7/1919 | French | 210—227 X |
| 2,091,623 | 8/1937 | Berrigan et al. | 210—236 X |
| 3,232,435 | 2/1966 | Fismer | 210—230 |
| 3,289,844 | 12/1966 | Emele | 210—255 |

FOREIGN PATENTS

| | | |
|---|---|---|
| 532,720 | 11/1954 | Belgium. |
| 1,144,689 | 3/1963 | Germany. |
| 1,200,258 | 9/1965 | Germany. |
| 13,317 | 11/1901 | Sweden. |

SAMIH N. ZAHARNA, *Primary Examiner.*

REUBEN FRIEDMAN, *Examiner.*

C. DITLOW, *Assistant Examiner.*